May 1, 1956 M. A. GILL 2,744,166

APPARATUS FOR DUPLICATING MAGNETIC RECORDINGS

Filed Aug. 11, 1950

INVENTOR.

Mellor A. Gill

BY

Hoag, Kilburn and Carlson

ATTORNEYS.

United States Patent Office 2,744,166

Patented May 1, 1956

2,744,166

APPARATUS FOR DUPLICATING MAGNETIC RECORDINGS

Mellor A. Gill, Elmhurst, N. Y.

Application August 11, 1950, Serial No. 178,783

7 Claims. (Cl. 179—100.2)

This invention relates in general to magnetic recording. It is more particularly concerned with the duplication of magnetic recordings formed on tape, wire or similar media forming a master record, on copy records of the same or similar media.

In order to duplicate magnetic recordings on a tape or wire, it has in the past been necessary to play the recording and simultaneously to record it on one or more tapes or wires by the use of individual recording heads, one for each copy desired. In such a system the recording signal is supplied from the previously recorded master medium through associated amplifiers and other electronic circuits while all media, master and copy, are driven at a mutually constant speed by a common or synchronized drive mechanism. That method since it involves electrical transcription requires the use of low-noise high-gain amplifiers, a bias supply for each recording head, perfectly synchronized drives to assure equal speeds between master and all copy media, uniform and certain contact of the master and copy media with the playback and recording heads respectively, uniform mechanical tension in all media and proper orientation of the playback and recording heads. The failure to meet any of these exacting requirements may result in copies which are unsatisfactory for commercial use because they will not reproduce with sufficient volume, are noisy, are non-uniform or suffer from distortion. That method has further disadvantages in that it subjects the master medium to numerous handlings during the run-through and rewind operations with the attendant possibility of damage thereto, and it is limited to a processing speed of approximately two to three times that of the basic playing speed.

More recently, a method for duplicating magnetic tape recordings on tape has been developed which eliminates the necessity of electrical transcription and the use of playback and recording heads. That method however requires the passage of the master and copy tapes with their magnetic surfaces in direct and certain physical contact through a localized alternating magnetic field used to enhance the magnetization and thus to produce a magnetization on the copy which is of the character and degree substantially that of the magnetization on the master tape. That method while an improvement on the playback method for the large scale production of magnetic tape recordings, is not useful for the duplication of magnetic wire recordings. It possesses further disadvantages in that the magnetic surfaces of the master tape and copy tapes must be maintained in direct physical contact without any relative slippage between them while they are moving at a relatively high speed through the alternating magnetic field. That method in addition to employing an electromagnet, requires the use of master and copy supply and take-up reels, a relatively complicated driving mechanism for the transfer of the tapes from the supply to the take-up reels, and subjects the master tape to numerous handlings during the run-through and rewind operations with the attendant possibility of damage thereto.

The present invention comprises a method and apparatus wherein alternating electric current is caused to pass through a master medium and a copy medium or media or through an additional conductor while the master medium is held in physical and electrical contact with the copy medium or media. The alternating current produces a magnetic field surrounding and permeating the copy medium or media which enhances the degree of magnetization of the copy medium or media resulting from the direct contact of the media and thereby produces magnetization on the copy medium or media of character and degree substantially that of the master medium. The method and apparatus is capable not only of duplicating a tape recording on tape or plurality of tapes, and a wire recording on wire or plurality of wires but also is capable of duplicating a tape recording on a wire or plurality of wires. In practising the present invention the master magnetic recording and copy medium on which the recording is to be duplicated are placed and maintained in physical and electrical contact with no relative motion therebetween nor is there any motion between said media and the electromagnetic field. The electromagnetic field is produced by passing an alternating electric current through the master medium or the copy medium or both. In a modified arrangement the alternating current may be passed through an additional conductor. The additional conductor need not for its entire length be in contact with either the master medium or the copy medium or media but merely need be connected to either and sufficiently close thereto so that the master medium and the copy medium or media are within the electromagnetic field produced by the alternating current. The alternating magnetic field should be of strength appreciably greater than the strength of the field corresponding to the saturation induction of the copy medium or media. When these precautions are observed the magnetic field enhances greatly the degree of magnetization that would have resulted merely from direct contact of the master medium and the copy medium or media. The resultant magnetization produced on the copy medium or media will be in character and degree substantially that of the master medium. Although the invention may be practised by use of an alternating current of constant strength, it has been found desirable in some cases and in use with some types of media to increase the current and the resultant magnetic field strength from zero to a maximum value and then back to zero. In use with some media advantageous results have been obtained by repeating this variation of current several times.

It is to be understood that the terms "master medium," "master record," "master tape," "master wire" and "magnetized medium," as used herein, refer to a magnetic wire, tape or other device upon which music, speech, or other signals have previously been recorded and that the terms "copy record," "duplicate record," "copy medium," "copy tape," "copy wire" and "magnetizable medium" as used herein, all refer to a magnetic wire, tape or similar device of magnetic material which initially possesses substantially no magnetization and upon which the magnetization of the master medium is to be duplicated.

It is to be further understood that when in the following specification and claims an expression such as "electrical contact" is used with reference to more than two conductors or wires, it is intended to cover thereby the situation where all of the wires or conductors are in electrical contact by reason of the fact that every wire or conductor is in physical contact with at least one other wire or conductor, but not necessarily in physical contact with all of the other wires or conductors. Further, the terms "active length" and "active surface" when occurring in the specification and in the claims are used to designate the portions of the master medium and of a copy medium on which recording is or duplicating occurs respectively as distinguished from the entire physical lengths or surfaces of such media which may include inactive end portions used for handling, threading, attachment and other similar purposes.

It is an object of the present invention to provide a method and apparatus for duplicating magnetic recordings on a tape, wire, or similar media which overcomes the above mentioned disadvantages of both of the earlier systems of the prior art.

It is a further object of the present invention to provide a method and apparatus for duplicating magnetic recordings on tape, wire or other similar media which does not require the use of playback and recording heads, low-noise high-gain amplifiers, bias supplies, electromagnetic circuits or drive mechanisms for transferring the master and copy media to and from their supply and take-up reels and which does not subject the master medium to numerous handlings during a run-through and rewind operation with the attendant possibility of damage thereto.

It is a further object of the present invention to provide an inexpensive, simple and practical method and apparatus for large scale production of magnetically pre-recorded material.

Other objects and advantages of the present invention which may be carried out in several different manners will appear in the following detailed description taken in conjunction with the accompanying drawings, in which.

Figure 1:
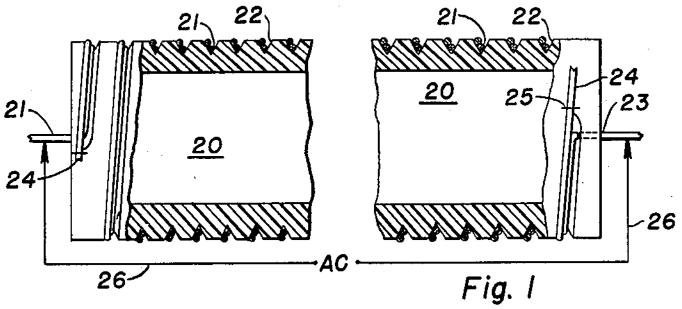
Fig. 1 is a partial cross sectional view illustrating one method of duplicating magnetic recordings in accordance with the present invention and the apparatus to be used therefor.

A device such as cylindrical form 20 as shown in Figs. 1 to 6 inclusive is employed for maintaining the master and copy media in contact during the duplicating process. Master medium 21, in this case in the form of magnetic wire, is placed in a helical groove 22 cut on cylindrical form 20. It may, preferably although not necessarily, be passed through the walls near the ends of cylindrical form 20 into the interior thereof and permanently secured thereto at the ends of cylindrical form 20 by suitable clamping devices 23. One or more copy media 24, also in the form of magnetic wire, is then placed in groove 22 in contact with master medium 21. The ends of copy medium 24 are temporarily but securely fastened to cylindrical form 20 by any convenient clamping devices such as 25. Since copy medium 24 is to be removed from cylindrical form 20 upon the completion of the process and replaced by another copy medium, clamping devices 25 are designed to be readily releasable. If so desired, copy medium 24 may be wound in groove 22 before master medium 21; there being no difference in the operation of the method or design of the apparatus whatever the order in which they are wound in groove 22. However, practical considerations for facilitating the production of copies dictate that copy medium 24 lie over master medium 21 so that the latter need not be removed each time a copy has been made. The ends of master medium 21 are connected to leads 26 which at their other ends are connected to a source of alternating current. When, as above stated, it is desired to vary the current passing through master medium 21 from zero to maximum, a potentiometer, variable resistor or any other well known current varying device may be interposed in the circuit between the source of alternating current and master medium 21. When alternating current is passed through master medium 21, a current also passes through copy medium 24 since the two are either in physical contact or are electrically connected. Even if copy medium 24 is a magnetically coated non-conductor, it will be within the electromagnetic field set up by the alternating current passing through master medium 21 and will carry a current on its coated surface. Copy medium 24 is thus magnetized and it will possess magnetization in character and degree substantially that of master medium 21.

Figure 2:
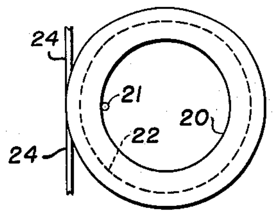
Fig. 2 is an end elevational view of the apparatus of Fig. 1.

In the embodiment of Figs. 1 and 2, only one copy wire 24 is in place, but it is readily apparent that two or more copy wires, the number depending only upon the physical dimensions of the wires used and the diameter of master wire 21, can be placed on cylindrical form 20 and in contact with master wire 21 and duplications made thereof at the same time.

Figure 3:
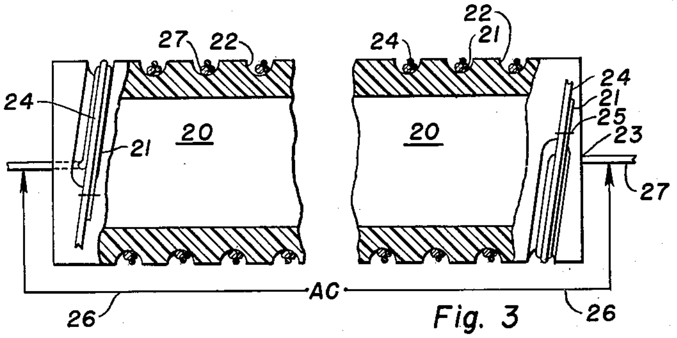
Fig. 3 is a partial cross sectional view illustrating a modification of the method and apparatus of Figs. 1 and 2.

A modification of the method and apparatus described above is shown in Figs. 3 and 4 in which an additional conductor is employed through which alternating electric current is introduced. This modification differs primarily from the embodiment of Figs. 1 and 2 in that the additional conductor has only one function, namely, to carry the alternating current producing the alternating magnetic field in the vicinity of and along the entire active length of copy medium 24; whereas the master medium in Figs. 1 and 2 has two functions, namely, to act as a conductor to carry the alternating current producing the alternating magnetic field and to provide the unidirectional field which is to be duplicated on copy medium 24. As shown in Fig. 3 an additional conductor 27 may be placed in helical groove 22 of cylindrical form 20 and, preferably although not necessarily, passed through the walls near the end of cylindrical form 20 into the interior thereof. It is permanently secured to cylindrical form 20 by any suitable means such as clamping devices 23. Master medium 21 in the form of magnetic wire is wound in groove 22 on cylindrical form 20 and is, preferably although not necessarily, permanently secured thereto also by suitable clamping devices such as 25. Copy medium 24 also in the form of magnetic wire is then wound in groove 22 in contact with master medium 21. A source of alternating current is connected through leads 26 to conductor 27. Thus an electromagnetic field is set up which includes within its flux lines both master medium 21 and copy medium 24. It is essential that master medium 21 and copy medium 24 be in contact with each other throughout their entire active length, but it is not necessary that additional conductor 27 be in contact with either master medium 21 or copy medium 24 as long as it is connected to one or both of them.

Figure 4:
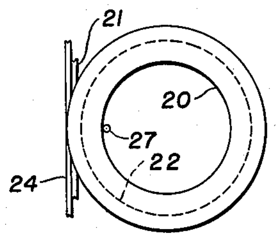
Fig. 4 is an end elevational view of the apparatus of Fig. 3.

In the arrangement disclosed in Figs. 3 and 4 it is possible to make one copy each from two different master media by separating the respective copy media 24 from each other and from the non-respective master media 21 by placing the two master media with their respectively associated copy media on opposite sides of additional conductor 27.

Figure 5:
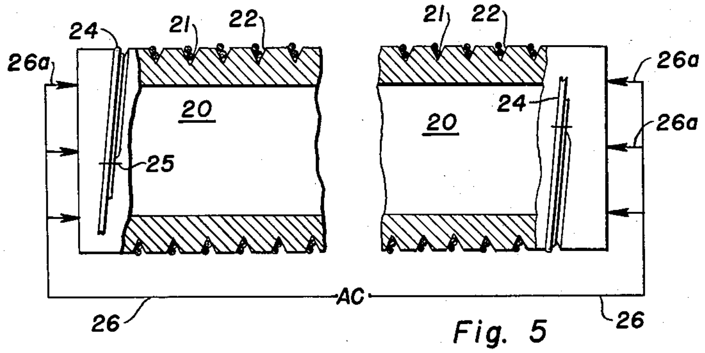
Fig. 5 is a partial cross sectional view illustrating a further modification of the method and apparatus of Figs. 1 and 2.
Figure 6:
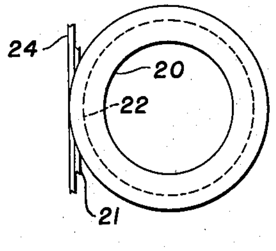
Fig. 6 is an end elevational view of the apparatus of Fig. 5.

The modification shown in Figs. 5 and 6 differs from those previously described in that cylindrical form 20 itself comprises the additional conductor through which the alternating current is passed. In this modification cylindrical form 20 is connected to leads 26, leading from a source of alternating current, through a plurality of connectors 26a. If, for any purpose, it is desired to rotate cylindrical form 20 during the passage of alternating current therethrough connectors 26a may be in the form of brushes disposed to sweep the end of cylindrical form 20. After master medium 21 and copy medium or media 24 have been placed in groove 22 on cylindrical form 20, alternating current is caused to pass through cylindrical form 20 in a manner similar to that previously described.

While for purposes of convenience, it may be desirable to construct form 20 in the shape of a hollow cylinder in the arrangement shown in Figs. 1, 2, 3 and 4, it is of especial advantage to construct form 20 as a hollow cylinder in the modification shown in Figs. 5 and 6 in order to concentrate the alternating current near the surface of form 20 and consequently near groove 22.

Figure 7:
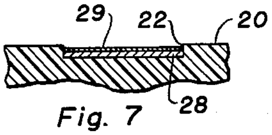
Figs. 7 to 10 are enlarged cross sectional views of a modification of the supporting form of Figs. 1 to 6 particularly suitable for the duplication of magnetic tape recordings.
Figure 8:
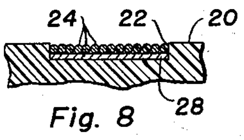

Figs. 7, 8, 9 and 10 show modifications in the construction of groove 22 in cylindrical form 20 which are of particular use when using a tape master recording instead of a wire master recording. Figs. 7 and 8 show the arrangement when the alternating current is passed through master tape 28 as is discussed with reference to master medium 21 of Figs. 1 and 2 and when the alternating current is passed through form 20 as is discussed with reference to Figs. 5 and 6. In Fig. 7 helical groove 22 instead of being relatively deep and generally V- or U-shaped is shallow and has a width sufficient to accommodate master tape 28 lying flatly therein with its playing side up. Copy tape 29 is wound in groove 22 on top of and with its playing side down and in contact with master tape 28. In the modification shown in Fig. 8 the duplication is from master tape 28 to a plurality of copy wires 24 which are wound alongside each other in flat helical groove 22 outside of master tape 28 with each wire in contact with the playing side of master tape 28.

Figure 9:
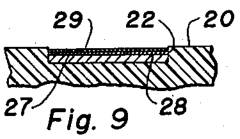
Figure 10:
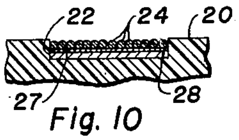

Figs. 9 and 10 relate to the arrangement of Figs. 3 and 4 where an additional conductor is used. Referring to Fig. 9, helical groove 22 is of a flat shape as above described and conductor 27 having the general form of a tape is first wound therein, then master tape 28 and copy tape 29 are wound in groove 22. The arrangement of Fig. 10 is similar to that of Fig. 8 where duplication is made from a master tape 28 to a plurality of copy wires 24 but where an additional conductor 27 is employed. Copy wires 24 are wound so that each is in contact with master tape 28.

Figure 11:
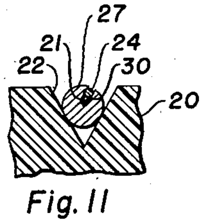
Fig. 11 is an enlarged cross sectional view of a modification of the portion of the arrangement of Figs. 3 and 4.

The arrangement shown in Fig. 11 is primarily useful in the form where an additional conductor is used and it is desired to have a maximum of flux density in the vicinity of the copy medium. In this arrangement conductor 27 is formed with a groove 30 extending lengthwise of said conductor and which is designed to receive and thus, at least partially, enclose master wire 21 and copy wire 24. Master wire 21 and copy wire 24 are inserted in groove 30 of conductor 27 after conductor 27 is wound in helical groove 22.

The merits and advantages of the method and apparatus should be clear from the foregoing description. The placing of a magnetized medium in contact with a magnetizable medium and passing an alternating current through either or both of these media, or through an additional conductor in contact therewith or adjacent thereto, provides a simple and most practical method for the duplication of magnetic recordings. Although shown and described in what is believed to be the most practical and preferred embodiments, it is apparent that departures from the specific methods and apparatus shown will suggest themselves to those skilled in the art and may be made without departing from the spirit and scope of the invention. I therefore do not wish to restrict myself to the particular methods, procedure and forms of construction illustrated and described, but desire to avail myself of all modifications that may fall within the scope of the appended claims.

Having thus described my invention, what I claim is:

1. Magnetic recording apparatus for duplicating a master record on at least one copy record comprising an electrically conductive cylindrical form having on the surface thereof a helical groove adapted to receive said master record and said copy record in physical and electrical contact with each other throughout the active surface of said master record, a source of alternating current and connections from said source of alternating current to the ends of said form.

2. Magnetic recording apparatus for duplicating a master record on duplicate records comprising an electrically conductive form for holding said records in physical and electrical contact with each other, a source of alternating current and means for passing alternating current from said source through said form.

3. Magnetic recording apparatus for duplicating a recording on a master tape on a copy tape comprising an electrically conductive hollow cylindrical form having a relatively flat helical groove in the surface thereof adapted to receive said master tape and said copy tape in physical and electrical contact with each other and with said form throughout the active length of said master tape and with the width of said tape disposed substantially parallel to the longitudinal axis of said form and connections from a source of alternating current to the ends of said form.

4. In apparatus for reproducing magnetic recordings, a master medium, a copy medium on which a copy is to be reproduced, means for holding said master medium in physical and electrical contact throughout its active length with said copy medium, a source of alternating current, and means for passing alternating current from said source through said media.

5. In apparatus for duplicating magnetic recordings, a plurality of conductors in electrical contact throughout their length wherein one conductor is a magnetized medium and at least one other conductor is a magnetizable medium in physical contact throughout its active length with said magnetized medium, a source of alternating current, and means for passing alternating current from said source through said conductors.

6. Apparatus as defined in claim 4, wherein said alternating current passing means include a conductor in electrical contact with said master medium throughout the active length of said master medium.

7. Apparatus as defined in claim 4, wherein said alternating current passing means include a conductor in physical contact with said master medium throughout the active length of said master medium.

References Cited in the file of this patent

UNITED STATES PATENTS 2,510,923 Brastad ---------------- June 6, 1950

OTHER REFERENCES

"Electronics," December 1949, pp. 78–83.